Apr. 3, 1923.
E. S. GRAFENSTATT
HYDRAULIC CLUTCH
Filed Sept. 3, 1920
1,450,679
2 sheets-sheet 1
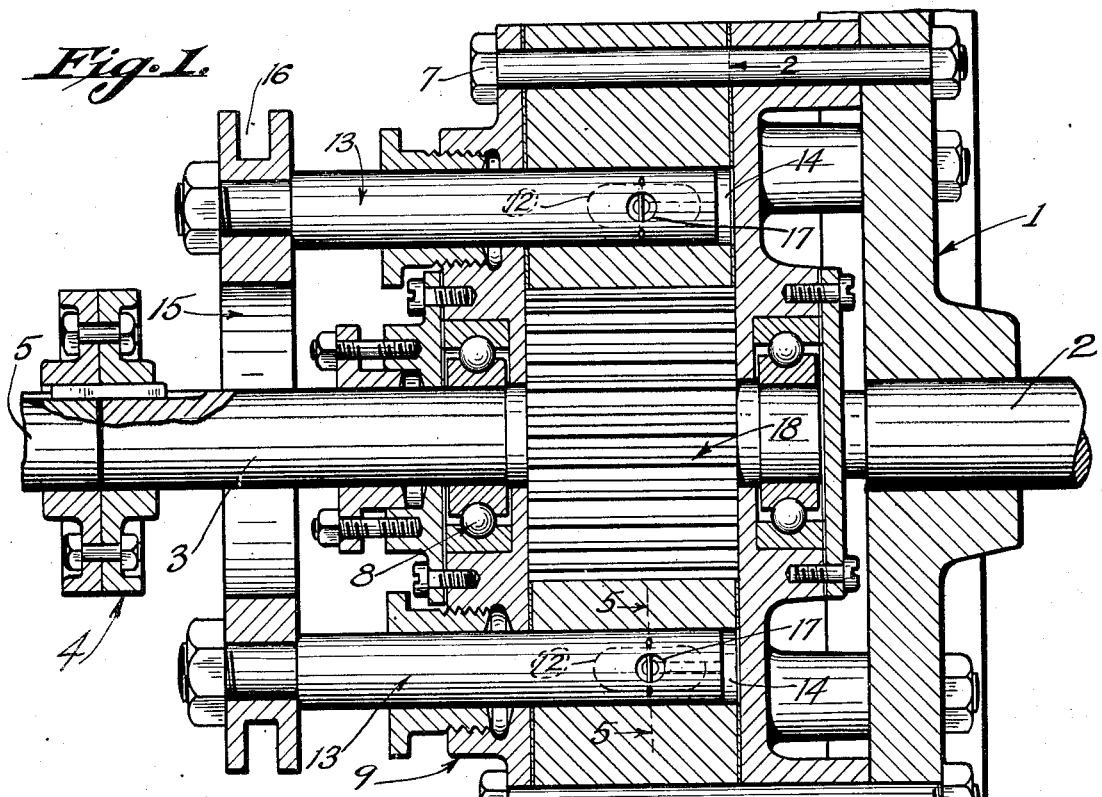
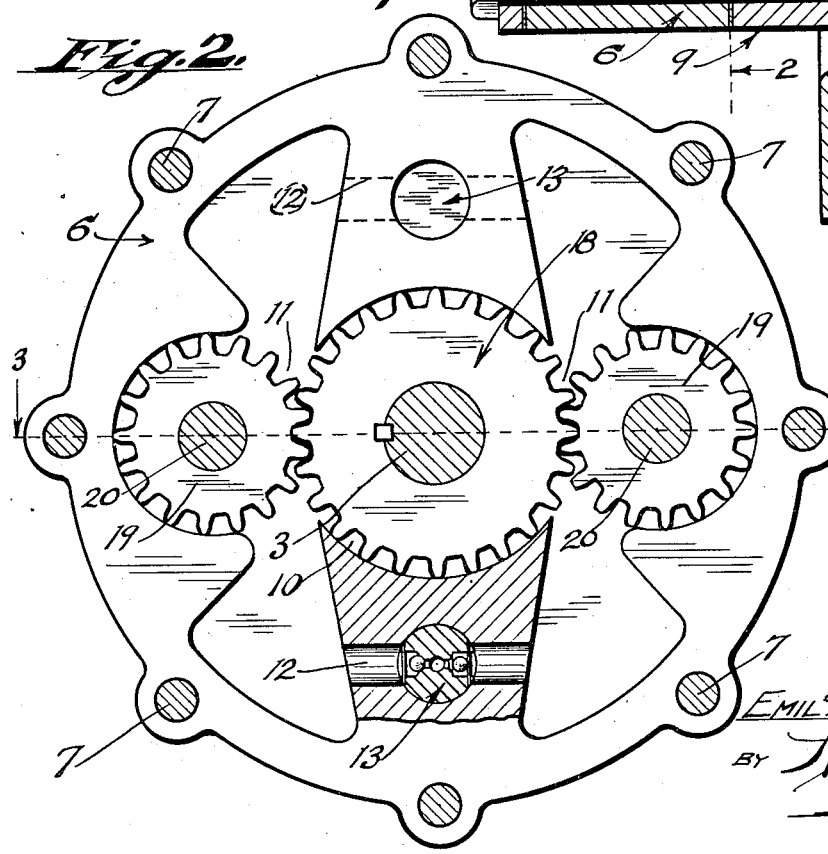
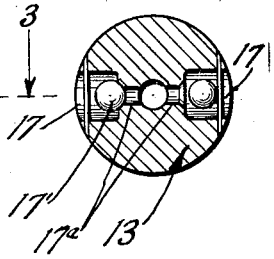
Inventor:
Emil S. Grafenstatt.
By Hazard & Miller
Attorneys.

Apr. 3, 1923.

E. S. GRAFENSTATT

HYDRAULIC CLUTCH

Filed Sept. 3, 1920     2 sheets-sheet 2

1,450,679

Inventor:
Emil S. Grafenstatt
By Hazard & Miller
Attorneys.

Patented Apr. 3, 1923.

1,450,679

UNITED STATES PATENT OFFICE.

EMIL S. GRAFENSTATT, OF LOS ANGELES, CALIFORNIA.

HYDRAULIC CLUTCH.

Application filed September 3, 1920. Serial No. 407,834.

*To all whom it may concern:*

Be it known that I, EMIL S. GRAFENSTATT, a citizen of the United States, residing at Los Angeles, in the county of Los Angeles and State of California, have invented new and useful Improvements in Hydraulic Clutches, of which the following is a specification.

It is the object of the present invention to provide an hydraulic clutch having means whereby the clutching engagement provided between a driving and a driven member may be accurately controlled by regulating the circulation of an hydraulic medium between meshing members loosely journaled with relation to the driving member and fixed for rotation with the driven member respectively.

The invention will be readily understood from the following description of the accompanying drawings in which Figure 1 is a longitudinal section through a clutch constructed in accordance with the invention.

Figure 2 is a transverse section on the line 2—2 of Figure 1.

Figure 5 is a detail transverse section on the line 5—5 of Figure 1.

Figure 3:
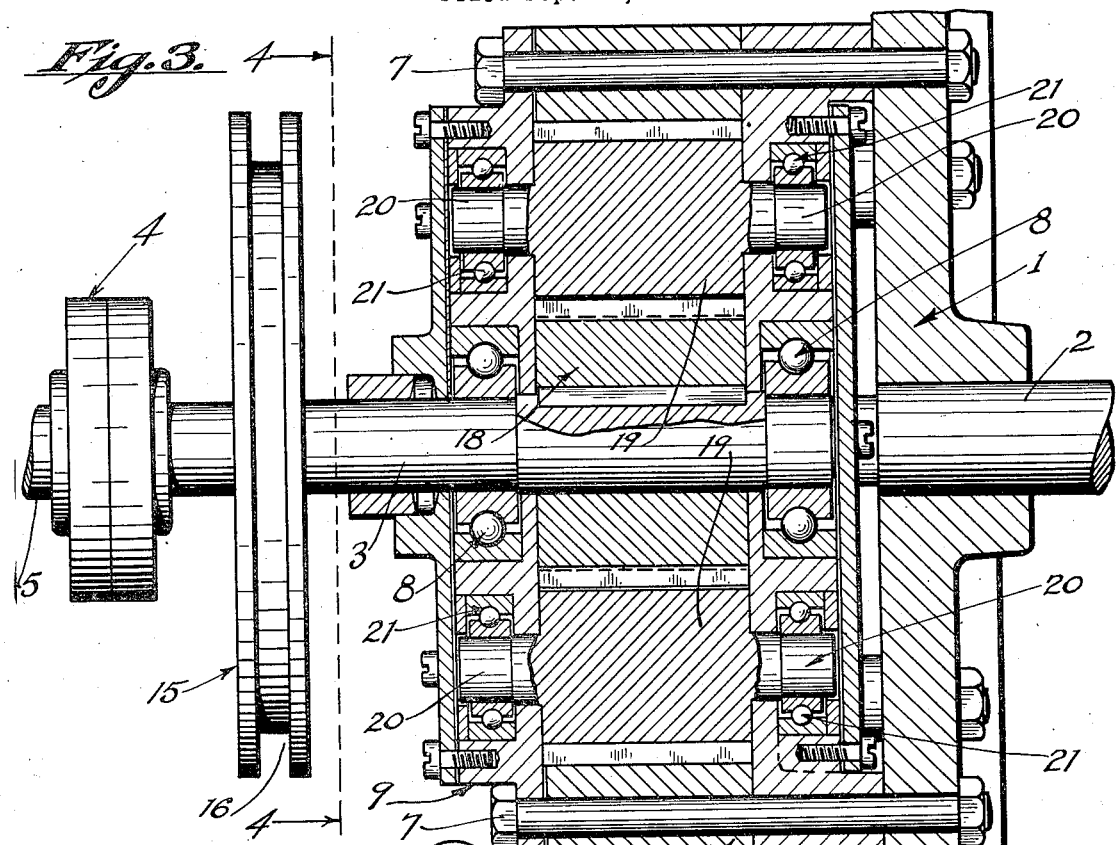
Figure 3 is a longitudinal section on the line 3—3 of Figure 2.
Figure 4:
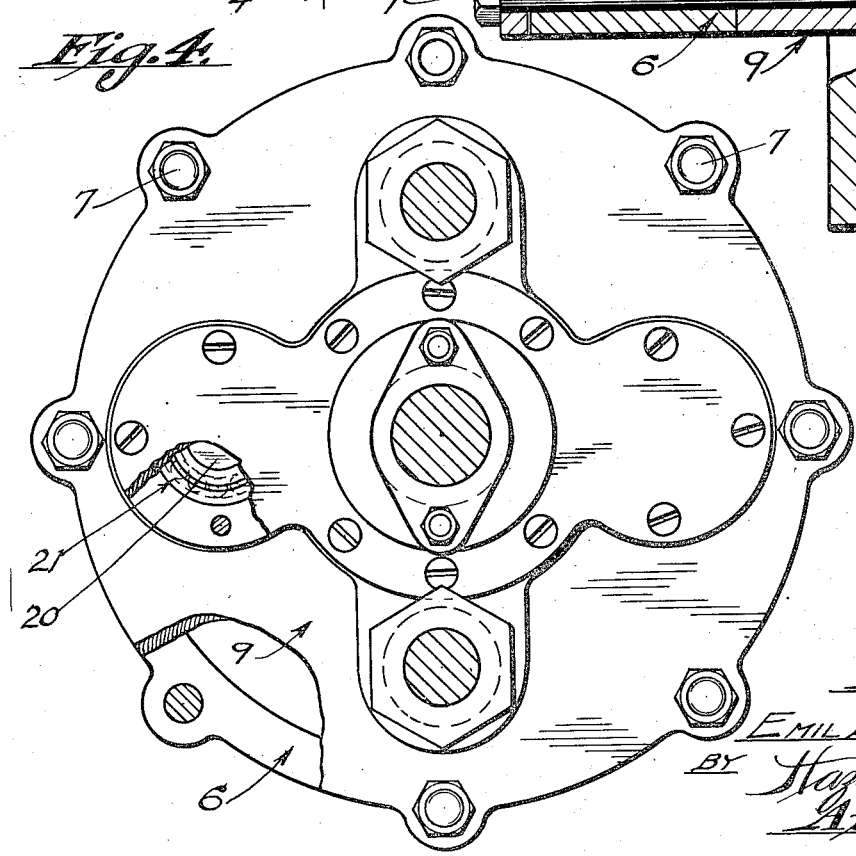
Figure 4 is a transverse section on the line 4—4 of Figure 3.

The clutch is arranged to form a driving connection between a driving member shown as comprising a fly wheel 1 upon shaft 2 and the driven member which includes the shaft end 3 connected by coupling 4 to a driven shaft 5.

A casing 6 is bolted to the fly wheel as by the bolts 7, said casing being in axial alinement with the fly wheel and carrying axially spaced ball bearings 8 for the shaft end 3, which is also in axial alinement with driving shaft 2 and the casing 6. End plates 9 are provided upon casing 6.

A chamber is formed within casing 6 closed at its ends by the end plates 9 to form a leak-proof container. This chamber includes an axially disposed space 10 communicating with passages 11 at opposite sides of space 10. The passages 11 communicate at their respective ends by ports 12 through which extend longitudinally disposed rods 13 received in suitable bores 14 extending through the casing. The outer ends of rods 13 are connected by a sleeve 15 longitudinally slidable and provided with a groove 16 adapted to be engaged by any suitable actuating mechanism (not shown) for longitudinally shifting rods 13 in their bores so as to completely shut off ports 12 or regulate the size of the openings through the same.

The rods 13 are provided with transverse by-passes 17 in alinement with ports 12 when the latter are closed by the rods, and these by-passes communicate with bores 17ª extending from the same to the inner ends of the rods. The by-passes are provided with inwardly opening check valves 17' at opposite sides of bores 17ª. By this arrangement when rods 13 are moved inwardly, one of the check valves in the respective by-passes will be closed by the pressure of a fluid attempting to circulate through passages 11 and ports 12, as will be hereinafter explained. The other check valve of the respective by-passes will be opened by the pressure of a fluid trapped beyond the ends of rods 13 in bores 14, and the escape of said fluid through the by-passes will thus be accomplished. The formation of compression pockets beyond the ends of rods 13 is thus prevented, while still permitting rods 13 to completely shut off ports 12.

A gear 18 is fixed upon shaft end 3 within space 10, said gear fitting within said space so as to prevent unobstructed circulation of a fluid within passages 11 from one passage to the other around the periphery of said gear. Pinions 19 are loosely journaled in the casing 6 within the respective passages 11, said pinions meshing with gear 18 at the opposite sides thereof. These pinions may be carried upon stub shafts 20 which are journaled in casing 6 preferably by ball bearings 21. The pinions 19 fit within the passages 11 so as to prevent unobstructed circulation of the fluid within said passages around the periphery of said pinions from one end to the other of said passages.

In operation the passages 11 having a suitable hydraulic medium received therein, when rods 13 are retracted so as to unobstruct the openings through ports 12, the fly wheel 1 may be rotated without causing rotation of shaft 5. Under these conditions the pinions 19 will freely revolve around the periphery of gear 18 without rotating said gear, the hydraulic medium within passages 11 freely moving from one passage to the other through ports 12.

When now the rods 13 are forced inwardly to partially shut off ports 12, shaft 5 will be rotated at a speed less than the speed of rotation of fly wheel 1, since the free circulation of the hydraulic medium in passages 11 is prevented and the pressure of the same will cause a partial rotation of gear 18 through the pinions 19.

When the ports 12 are completely shut off the shaft 5 will be rotated at the speed of fly wheel 1, since the circulation of hydraulic medium in pasages 11 will be completely shut off and the gear 18 will thereby be held in fixed relation to pinions 19 so as to be rotated by the revolving of said pinions around the axis of the mechanism.

It will be apparent that various changes may be made in the construction as thus described without departing from the spirit of the invention.

What is claimed is:

1. The combination with a fly wheel of a casing secured thereto, said casing having diametrically opposite chambers, pinions loosely journaled in said chambers, said chambers having ports connecting the same at opposite sides of said pinions, a driven shaft carrying a gear meshing with said pinions, closure rods for said ports connected for longitudinal adjustment to regulate the openings through said ports, said rods having valve means for allowing escapement of a hydraulic medium from the spaces at the ends of said rods.

2. The combination with a fly wheel of a casing secured thereto, said casing having diametrically opposite chambers, pinions loosely journaled in said chambers, said chambers having ports connecting the same at opposite sides of said pinions, a driven shaft carrying a gear meshing with said pinions, closure rods for said ports connected for longitudinal adjustment to regulate the openings through said ports, said rods having by-passes through the same in alinement with said ports when the latter are closed by said rods, said by-passes having valves therein arranged to cause communication between the spaces at the ends of said rods and the portions of said ports at one side of said rods, while closing said spaces to the portions of said ports at the other side of said rods.

3. The combination with a fly wheel of a casing secured thereto, said casing have diametrically opposite chambers, pinions loosely journaled in said chambers, said chambers having ports connecting the same at opposite sides of said pinions, a driven shaft carrying a gear meshing with said pinions, closure rods for said ports connected for longitudinal adjustment to regulate the openings through said ports, said rods having valves therein arranged to cause communication between the spaces at the ends of said rods and the portions of said ports at one side of said rods, while closing said spaces to the portions of said ports at the other side of said rods.

4. The combination with a fly wheel of a casing secured thereto, said casing having diametrically opposite chambers, pinions loosely journaled in said chambers, said chambers having ports connecting the same at opposite sides of said pinions, a driven shaft carrying a gear meshing with said pinions, closure rods for said ports connected for longitudinal adjustment to regulate the openings through said ports, said rods having fluid actuated check valves therein arranged to cause communication between the spaces at the ends of said rods and the portions of said ports at one side of said rods, while closing said spaces to the portions of said ports at the other side of said rods.

5. The combination with a fly wheel of a casing secured thereto, said casing having diametrically opposite chambers, pinions loosely journaled in said chambers, said chambers having ports connecting the same at opposite sides of said pinions, a driven shaft carrying a gear meshing with said pinions, closure rods for said ports connected for longitudinal adjustment to regulate the openings through said ports, said rods having fluid actuated oppositely acting check valves therein arranged to cause communication between the spaces at the ends of said rods and the portions of said ports at one side of said rods, while closing said spaces to the portions of said ports at the other side of said rods.

6. In a hydraulic transmission, a casing provided with a driving shaft, a gear axially arranged in the casing, means for dividing the casing into substantially separate chambers, a gear pinion arranged in a recess in one of the chambers and meshing constantly with said gear and being journaled in the casing, a port extending through the chamber forming means to provide for flow of a liquid medium from one chamber to the other, a rod arranged in a pocket intersecting said port and having a bore hole extending to the end of the rod to provide for flow of trapped liquid in said pocket, and valves in said rod controlling the flow.

In testimony whereof I have signed my name to this specification.

EMIL S. GRAFENSTATT.